Patented Aug. 6, 1940

2,210,367

UNITED STATES PATENT OFFICE 2,210,367

METHOD OF PRODUCING BINDING AGENTS

Karl Halbach, Dusseldorf, Germany

No Drawing. Application June 2, 1937, Serial No. 145,959½. In Germany June 2, 1936

4 Claims. (Cl. 106—27)

This invention relates to binding agents of the class comprising cement, lime, stone-dusts (in powder, meal or flour-form) and the like, and has for its object to provide a method of producing binding agents which, in comparison with the usual cements, exhibit less violent reaction-phenomena in use, that is, permit of a longer setting period, and are less inclined to form cracks or fissures in the finished structure owing to the lower internal stresses.

According to the present invention, cement, lime, stone-dust or like binding agents are subjected wholly, or preferably in part, to a water treatment and subsequently dried by the heat of reaction of unslaked lime. Furthermore, if desired, the water treatment can be utilised for distributing water-repelling substances, such as bitumen, tar or the like, in the mass under treatment.

As a suitable example, stone-dusts or the like, singly or in mixtures, may be subjected to a water treatment, water repelling substance such as bitumen or tar being added to the aqueous mass in the form of an emulsion or dispersion or in hot liquid form and the said mass being dried by the heat of reaction of unslaked lime.

As only a part or one component of the complete binding agent need be subjected to the water treatment or bitumenisation, the components as a whole may consist not only of hydraulic, but also of non-hydraulic or latent-hydraulic, substances.

The treatment of the substance with water is apart from any bitumenisation or the like so that it is essential to dry the product, and an important feature of the invention resides in the drying out of the water by the use of unslaked lime.

The unslaked lime also presents other advantages. If, for instance, cement is treated with water, it tends to form nodules during drying. The unslaked lime which, in a finely ground condition, can be very uniformly distributed in the mass, not only provides for a uniform evolution of heat in all parts of the mixed mass but also, owing to the increase of volume of the lime, for the breaking up of any agglomeration which may form. In fact, by the addition of the unslaked lime, a pulverulent substance may be obtained from the aqueous mass.

If a water-repelling substance, such as bitumen, tar, resin or wax, is also added to the aqueous mass to be subjected to the lime-drying, then during the drying process there is formed, around the individual grain of the originating material as well as that of the unslaked lime itself, an extremely fine, firmly adhering, jacket of the water-repelling substance which allows the jacketed grains still to retain a capacity for reaction.

Vegetable and animal oils and fats are in general not suitable for the present method, as water-repelling substances, because they are inclined not to form a sheath around the fine particles but, rather, to impregnate the same completely, so that these particles are prevented from taking part in subsequent chemical reactions which effect setting in the use of the binding agents. Moreover, and even in other cases, the same difficulties regarding the distribution of these substances do not arise as in the present case where it is a question of mixing, as well as possible with pulverulent substances, bitumen, resin, tar and the like, that is, substances which have a more or less glutinous and viscous character.

By the application of the present method the procedure may now be adopted of first preliminarily distributing the water-repelling substance, in the presence of water, in the originating mass consisting of cement, lime, stone-dusts (singly or in mixtures) or the like. Thereafter finely ground unslaked lime serving for the drying step of the method, is added and mixed therewith. It is of material advantage to have a thorough preliminary distribution of the water-repelling substance in the originating material before the evaporation-process is initiated by the addition of the unslaked lime.

In carrying out this step, the quantity of the water-repelling substance to be used should preferably be so proportioned that, at the conclusion, not only the originating material but also the subsequently added quantities of unslaked lime are sheathed with the water-repelling substance. The unslaked lime is preferably employed in a finely ground state for the reasons mentioned. However, the lime may also be used in the form of small pieces, particularly if it is a high-percentage lime or if, for the particular purpose of use of the binding agent in view, the presence of a certain proportion of unsheathed lime is desirable.

The evolution of heat produced by the unslaked lime may be further assisted by using the substances forming the originating material and also the water and the unslaked lime or other additions subsequently introduced, in a warmed or heated condition for the treatment with the water-repelling substance.

The quantity of water to be used for the preliminary distribution of the water-repelling substance in the originating material may be considerably reduced, if the material to be sheathed in such substance is not brought into conjunction with the water in its entirety from the start, but instead, if first of all a portion only of this material is mixed with water and the water-repelling substance and the further quantity of the said material is then introduced subsequently, either simultaneously or in succession with the unslaked lime to be added subsequently. If, by this means, a smaller proportion of water is sufficient it will be understood that a correspondingly smaller quantity of unslaked lime is required for driving off the smaller proportion of water. In particular, it is desirable that the quantity of unslaked lime used for the drying should be as small as possible in the sheathing of cement with a water-repelling substance. If there is a suitable large quantity of unslaked lime in the originating material in which the water-repelling substance is preliminarily distributed in the presence of water, cement without unslaked lime may subsequently be added alone, preferably in a heated condition. This modification may be appropriately applied to the treatment and the further addition of stone-dusts singly or in mixtures.

If finely ground unslaked lime and cement or stone-dusts are well mixed together in a dry state and to this originating material water and water-repelling substance are gradually added, then a favorable condition for a specially good distribution, in particular, of the ground lime in the whole mass is ensured by the said simultaneous addition to the substances already mixed together in the dry.

It has already been mentioned that bitumen or tar may be used as water-repelling substances in the form of an emulsion or dispersion or in a hot liquid form. However, the invention is not restricted to the use of these water-repelling substances. If, for example, a lighter color of the final product is desired, natural or artificial resins may be employed as water-repelling substances and said resins may be liquified before use. The liquifying of the resins is effected by addition thereto of oils, tar, Venice turpentine or soft waxes or other known fluxing or solvent agents.

However, waxes may also be used by themselves as water-repelling substances.

The pulverulent material treated with a water-repelling susbtance and produced in accordance with the present invention may now, depending upon the originating substances, be used by itself as a binding agent. However, this material may also be mixed with untreated cement or with another hydraulic or non-hydraulic untreated mortar-forming material. The material treated with the water-repelling substance may also be mixed not only with cement but also with hydraulic lime or with gypsum, sorrel, cement or the like.

By way of further explanation, reference is now directed to the following practical examples:

① 20 kgs. of cement and 8 kgs. of calcined, finely ground, unslaked lime are warmed to about 80 to 90° C. and well mixed in a mixer. To this mixture 4 litres of hot water are then added in the course, say, of a minute and with further stirring and thereafter 6 litres of a 50% bitumen-emulsion are dispersed in the mixture.

Due to the evolution of heat by the slaking lime and to the chemical combination of water, the water is partially evaporated and partially chemically combined and, upon further stirring, a water-repelling powder well sheathed with bitumen is produced.

This product may be employed by itself as a hydraulic binding agent or it is mixed with untreated cement.

② 20 kgs. of cement at a temperature of 80 to 90° C. are stirred in a mixer with 10 to 13 litres of hot water. Thereafter, 3 kgs. of hot liquid bitumen are added and well mixed through, so that a preliminary distribution of the bitumen is effected. Next, 10 kgs. of finely ground, high percentage, unslaked lime are added in a hot condition with further stirring. Due to the slaking process, the water is partially evaporated and partially chemically combined and a bitumen-sheathed water-repelling powder is formed as the final product.

③ 14 kgs. of cement are introduced with 9 to 11 litres of water, both at a temperature of 80 to 90° C. into the mixer and then 3 kgs. of hot liquid bitumen are added with constant stirring of the mass. After the bitumen has been well distributed preliminarily, a further addition is made of 9 kgs. of cement and 7 kgs. of finely ground unslaked lime, both heated and well mixed together.

The carrying out of the method is not restricted to a special apparatus. In particular, and on the contrary, use may be made of the most diverse known open or closed mixing devices or vessels and drying devices for the preliminary warming or heating of the substances used.

I claim:

1. Method for the production of a binding agent, consisting in subjecting a calcareous matrix to a water-treatment, distributing bitumen as a water-repelling substance in the mass under treatment, and effecting drying of the mass by the heat of reaction of unslaked lime, the bitumen being added in the presence of water to the originating material in such quantity that the originating material and subsequently added quantities of unslaked lime are sheathed by the bitumen.

2. Method for the production of a binding agent, consisting in subjecting a calcareous matrix to a water-treatment, distributing bitumen as a water-repelling substance in the mass under treatment, and effecting drying of the mass by the heat of reaction of unslaked lime, the originating matrix and also the water and subsequently introduced unslaked lime being used in a heated condition for the treatment with said bitumen.

3. Method for the production of a binding agent consisting in subjecting a calcareous matrix to a water treatment, distributing a water-repelling substance of the order of bitumen or tar in emulsified form in the mass in the presence of water then adding additional material of the class comprising cement and stone dusts and drying the mass by the heat of reaction of finely ground unslaked lime and also by the reaction of said additional material.

4. Method for the production of a binding agent consisting in subjecting a calcareous matrix to a water treatment, distributing liquified bitumen as a water-repelling substance in the mass in the presence of water and drying the mass by the heat of reaction of finely ground unslaked lime, subsequently adding additional quantities of finely ground unslaked lime and quantities of calcareous matrix intimately mixed before their introduction into the originating material treated with the water-repelling substance.

KARL HALBACH.